(12) United States Patent
Damrath

(10) Patent No.: US 6,646,234 B2
(45) Date of Patent: Nov. 11, 2003

(54) ELECTRIC EGG COOKER

(75) Inventor: Joachim Damrath, Bachhagel (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 0 days.

(21) Appl. No.: 10/233,912

(22) Filed: Sep. 3, 2002

(65) Prior Publication Data

US 2003/0070560 A1 Apr. 17, 2003

Related U.S. Application Data

(63) Continuation of application No. PCT/EP01/01908, filed on Feb. 20, 2001.

(30) Foreign Application Priority Data

Mar. 3, 2000 (DE) .......................................... 100 10 630

(51) Int. Cl.⁷ .............................. A47J 29/00; A47J 29/06
(52) U.S. Cl. ........................ 219/411; 219/386; 219/400; 99/440
(58) Field of Search .............................. 219/385, 386, 219/392, 400, 411; 99/440

(56) References Cited

U.S. PATENT DOCUMENTS

| | | | | |
|---|---|---|---|---|
| 3,065,688 A | * | 11/1962 | Lindemann | .................. 99/440 |
| 3,227,065 A | | 1/1966 | Litman | |
| 3,581,653 A | * | 6/1971 | Boyer et al. | ................... 99/332 |
| 3,584,605 A | * | 6/1971 | Schwartz | ..................... 119/37 |
| 5,699,722 A | * | 12/1997 | Erickson et al. | |
| 6,393,969 B1 | * | 5/2002 | Kim | ............................. 99/331 |

FOREIGN PATENT DOCUMENTS

| | | | |
|---|---|---|---|
| DE | 1 869 521 | | 3/1963 |
| DE | 1 891 125 | | 4/1964 |
| DE | 1 429 788 | | 11/1970 |
| DE | 2 102 062 | | 7/1972 |
| DE | 733 26 78 U1 | | 12/1973 |
| DE | 2354687 | * | 5/1975 |
| FR | 2 152 654 | | 9/1972 |
| FR | 2 664 806 A1 | | 1/1992 |

* cited by examiner

*Primary Examiner*—Joseph Pelham
(74) *Attorney, Agent, or Firm*—Laurence A. Greenberg; Werner H. Stemer; Ralph E. Locher

(57) ABSTRACT

Cooking eggs in an electric egg cooker involves the risk of egg contents escaping through openings in the shell and soiling the cooker. To make the egg cooker easy to care for, it is important, in such a situation, for the soiled parts to be easily cleaned. However, this is generally not the case for the electrical components. An egg cooker includes having all of the electrical components disposed above a position of the eggs that are to be cooked so that substantially only the mechanical components that lie next to or below the eggs are affected by soiling. These mechanical components, advantageously, can be removed and may also be dishwasher-safe. As such, caring for an electric egg cooker is made significantly easier.

16 Claims, 1 Drawing Sheet

ELECTRIC EGG COOKER

CROSS-REFERENCE TO RELATED APPLICATION

This application is a continuation of copending International Application No. PCT/EP01/01908, filed Feb. 20, 2001, which designated the United States and was not published in English.

BACKGROUND OF THE INVENTION

FIELD OF THE INVENTION

The invention relates to an electric egg cooker having a heating device and an egg holder.

To cook eggs, conventionally, the eggs are cooked in a hot water bath or in a steam atmosphere for the required thermal energy to be transferred to the eggs. Furthermore, German Published, Non-Prosecuted Patent Application DE 1 429 788, German Utility Model DE 733 26 78 U1, German Utility Model DE 1 869 521 U1, German Utility Model DE 1 891 125 U1 and U.S. Pat. No. 3,227,065 to Litman, disclose egg cookers in which the heat is transferred to the eggs in the form of radiant heat or convective heat. There is a fundamental risk when cooking eggs that egg contents will escape through openings in the shell and soil the egg cooker. Openings may form, for example, as a result of cracks in the shell; under certain circumstances, it is also possible that egg contents may escape through the small hole that is usually made on the side of the air cushion before cooking. In such case, in all the prior art egg cookers, the drawback arises, in particular, that parts of the egg cooker that have been soiled by egg contents cannot be cleaned or can only be cleaned with difficulty. The reason for this is, generally, that electrical components, which are difficult to clean and/or difficult or impossible to remove for cleaning purposes, are affected by the soiling.

SUMMARY OF THE INVENTION

It is accordingly an object of the invention to provide an electric egg cooker that overcomes the hereinaforementioned disadvantages of the heretofore-known devices of this general type and that simplifies care and, in particular, cleaning.

With the foregoing and other objects in view, there is provided, in accordance with the invention, an electric egg cooker, including electrical components including a heating device, an egg holder holding eggs in a cooking position, all of the electrical components being disposed above the egg holder at a position dependent upon the egg holder.

According to the invention, the simplification is achieved by an electric egg cooker in which all the electrical components of the egg cooker are disposed above the egg position for eggs that are to be cooked, which position is determined by the egg holder.

Should egg contents escape in an egg cooker according to the invention, it would be substantially mechanical components of the egg cooker that would be soiled. However, the mechanical components can be of considerably simpler construction than the electrical components. Thus, they are easy to clean and can also easily be removed to simplify cleaning.

Such an advantage even results in an egg cooker according to the invention in which the eggs are prepared without a shell and in which the egg contents are cooked in a corresponding holder. In such a case too, there is a risk of egg contents being shaken out of the holder and soiling other parts of the egg cooker.

For example, the heating device may be of the type that emits radiant heat or convective heat. In these egg cookers that operate without water or steam, there is a high risk of the eggshell cracking and egg contents escaping as a result of high or uneven transfer of energy to the eggs.

In accordance with another feature of the invention, it is advantageous for the mechanical components that are disposed below or next to the egg position and are preferentially affected by soiling to be at least partially removable, which considerably simplifies cleaning. In addition, the removable mechanical components may be configured as dishwasher-safe, for example, by selecting suitable materials or surface coatings. Such selection makes cleaning particularly simple because the soiled parts simply have to be removed and placed into the dishwasher, which is an increasingly common household appliance.

In an egg cooker having a housing lower part and a housing upper part, in accordance with a further feature of the invention, the all the electrical components may be connected to the housing upper part. When the housing upper part is folded open or removed, only mechanical components remain with the housing lower part, and these mechanical components may be of particularly simple construction such that they are easy to clean, in particular, in a dishwasher. If the egg cooker has a device for turning the eggs during cooking, according to the invention, an electric drive for the egg-turning device is disposed above the egg position.

In particular, in an egg cooker with an electrically driven egg-turning device, the drive may be disposed in a housing upper part and may be connected to the egg-turning device in the housing lower part such that the connection is automatically released when the housing upper part is removed or folded open. The release can be achieved, for example, by a plug-fit coupling for rotationally fixed connection, by which the drive and egg-turning device can be connected, and that allows simple release in the longitudinal direction.

In accordance with an added feature of the invention, the electric drive is disposed in the housing upper part, the turning device has a spindle removably connecting the electric drive to the turning device in a rotationally fixed manner through an automatically released connection, and the connection automatically releases when the housing upper part is one of removed and pivoted from the housing lower part.

With the objects of the invention in view, there is also provided a electric egg cooker, including a housing lower part, a housing upper part at least one of removably connected to the housing lower part and pivotally connected to the housing lower part, a removable, dishwasher-safe, egg holder holding eggs in a cooking position, the egg holder disposed in the housing lower part, a removable, dishwasher-safe, turning device for turning the eggs, the turning device disposed adjacent the cooking position, electrical components including a heating device and an electric drive disposed above the cooking position and connected to the turning device for turning the turning device, and all of the electrical components disposed in the housing upper part and above the egg holder at a distance dependent upon the egg holder.

In accordance with an additional feature of the invention, a turning device is disposed below the cooking position in the housing lower part.

In accordance with a concomitant feature of the invention, the turning device has a spindle removably connecting the electric drive to the turning device in a rotationally fixed manner through an automatically released connection and the connection automatically releases when the housing upper part is one of removed and pivoted from the housing lower part.

Other features that are considered as characteristic for the invention are set forth in the appended claims.

Although the invention is illustrated and described herein as embodied in an electric egg cooker, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
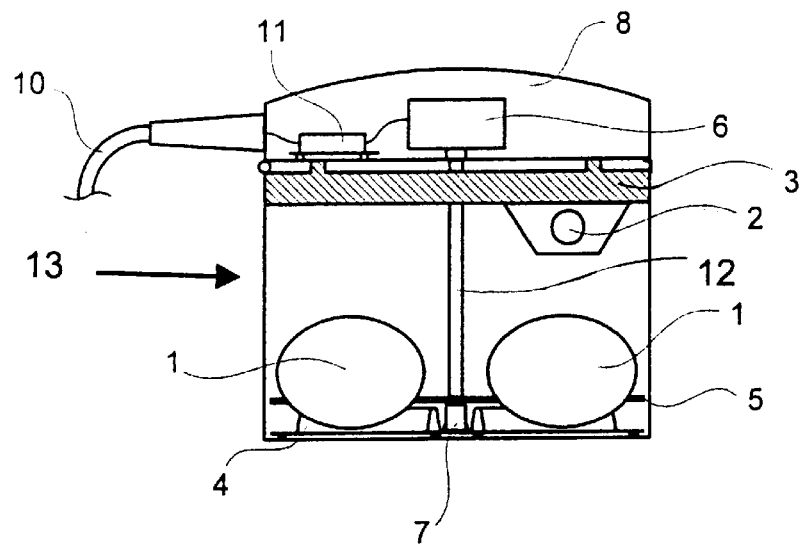
FIG. 1 is a fragmentary, diagrammatic, cross-sectional view of an egg cooker according to the invention.

Referring now to the figures of the drawings in detail and first, particularly to FIG. 1 thereof, there is shown an egg cooker having a housing upper part 8 and a housing lower part 13. A device for turning eggs 1 that are to be cooked is disposed in the housing lower part 13 and includes a turning lower part 4 and an egg support 5. The turning lower part 4 includes a circular disk on which turning ribs 14 are disposed in a star shape, with a vertically positioned bearing bushing 7 disposed in a center of the ribs 14. The turning lower part 4 rests loosely in the housing lower part 13, is held laterally by the housing lower part 13, and is removable.

In the operating position of the egg cooker, above the turning lower part 4, there is an egg support 5 for holding the eggs 1. The egg support 5 has a round disk with apertures 9 that are disposed on a circular path and in which the eggs 1 are held such that they project below the disk and are oriented with their longitudinal axes in a star shape. The egg support 5 also includes a spindle 12 that is secured vertically in the center of the disk. Below the egg support, the spindle 12 has a short, non-illustrated, protruding section that can be held rotatably by the bearing bush 7. Above the egg support 5, the spindle 12 has a longer section that extends as far as the housing upper part 8 and, at the upper end, has a non-illustrated coupling section for receiving a mating piece to provide a drive in the direction of rotation.

In the housing upper part 8 there is an electric rotary drive 6, the shaft of which is formed such that it can be fitted onto the coupling section of the spindle 12 and can drive the spindle 12 in a rotation direction. Furthermore, a thermal insulation 3 is secured to the housing 8 at the bottom, and a heating device 2, in the form of a halogen bar, which emits radiant heat, is, in turn, secured to the thermal insulation 3. To control the drive 6 and the heating device 2, a control device 11 is provided in the housing upper part 8 and is connected to a connection cable 10 for supplying electrical energy to the egg cooker.

The housing upper part 8 is articulatedly connected to the housing lower part 13 and can be folded open; as an alternative, or in addition, it is possible for the housing upper part 8 to be completely removed from the housing lower part 13. If the housing upper part is removed or folded open, the shaft of the drive 6 is detached from the coupling section of the spindle 12.

According to the invention, all the electrical components 2, 6, 10, and 11 are disposed above the position of the eggs 1 that are to be cooked. In addition, all the electrical components 2, 6, 10, and 11 are connected to the housing upper part 8, and, consequently, they can be folded away or completely removed from the housing lower part 13 together with the housing upper part 8.

Figures 2, 3:
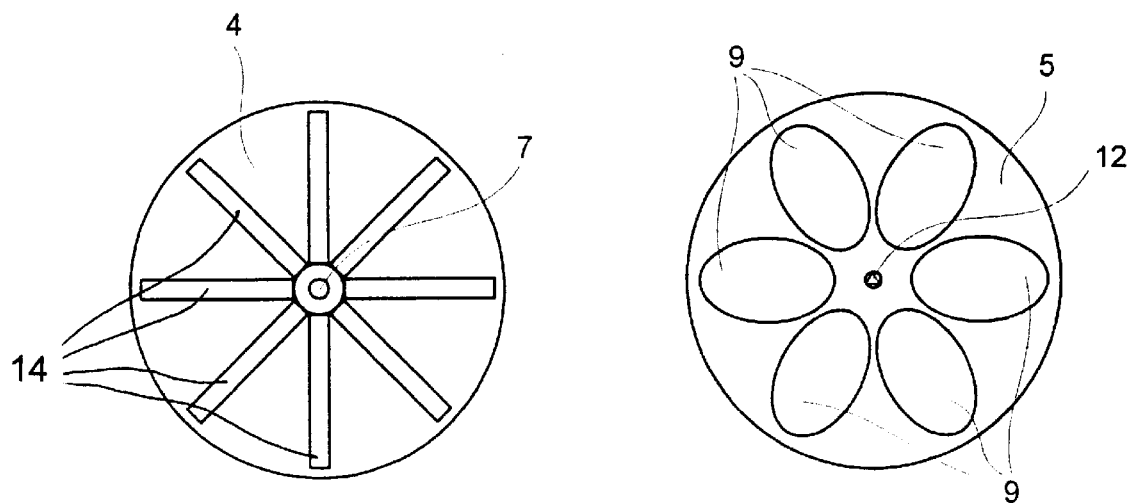
FIG. 2 is a plan view of a housing lower part of FIG. 1 without an egg support.
FIG. 3 is a plan view of an egg support of FIG. 1.

FIG. 2 illustrates the turning lower part 4 with the turning ribs 14 disposed in a star shape and the centrally disposed bearing bush 7. FIG. 3 illustrates the egg support 5 with the apertures 9 disposed in a star shape on a circular path and the centrally disposed spindle 12.

To cook the eggs 1, the control device 11 actuates the drive 6 and the heating device 2. The eggs 1 are slowly moved round below the heating device 2 as a result of a rotation of the egg support 5 and, in the process, are acted on by thermal radiation. During the rotation of the egg support 5, the sections of the eggs 1 that protrude downward are guided onto the turning ribs on the turning lower part 4 so that they are lifted by the turning ribs and roll over the top edges thereof. As such, the eggs 1 are also turned about their longitudinal axis within the apertures 9 to heat the eggs 1 uniformly from all sides during the cooking operation.

If contents escape from the eggs 1 through an opening in the shell, substantially the parts that lie next to or below them are affected by the soiling, such as, in particular, the egg support 5 and the turning lower part 4, and these parts can advantageously be removed from the egg cooker for cleaning, in particular, in a dishwasher. If the housing lower part 13 can be separated from the housing upper part 8, the housing lower part 13 can also easily be cleaned in the event of soiling because, in the present exemplary embodiment, it does not include any electrical components.

I claim:

1. An electric egg cooker, comprising:
    electrical components including a heating device;
    an egg holder holding eggs in a cooking position;
    all of said electrical components being disposed above said egg holder at a position dependent upon said egg holder.

2. The egg cooker according to claim 1, wherein said heating device emits one of radiant heat and convective heat.

3. The egg cooker according to claim 1, including mechanical components, said egg holder being one of said mechanical components, and at least one of said mechanical components being removable and disposed one of below and adjacent said cooking position of the eggs in said egg holder.

4. The egg cooker according to claim 3, wherein said at least one removable mechanical component is dishwasher-safe.

5. The egg cooker according to claim 1, including a removable mechanical component disposed below said cooking position of the eggs in said egg holder.

6. The egg cooker according to claim 5, wherein said removable mechanical component is dishwasher-safe.

7. The egg cooker according to claim 1, including a removable mechanical component disposed adjacent said cooking position of the eggs in said egg holder.

8. The egg cooker according to claim 7, wherein said removable mechanical component is dishwasher-safe.

9. The egg cooker according to claim 1, including:
a housing lower part;
a housing upper part at least one of:
 removably connected to said housing lower part; and
 pivotally connected to said housing lower part; and
all of said electrical components being connected to said housing upper part.

10. The egg cooker according to claim 1, including:
a device for turning at least one of the eggs disposed at least one of below and adjacent said cooking position of the eggs in said egg holder; and
an electric drive disposed above said cooking position of the eggs in said egg holder and connected to said turning device for turning said turning device.

11. The egg cooker according to claim 9, including:
a device for turning at least one of the eggs disposed at least one of below and adjacent said cooking position of the eggs in said egg holder; and
an electric drive disposed above said cooking position of the eggs in said egg holder and connected to said turning device for turning said turning device.

12. The egg cooker according to claim 11, wherein:
said electric drive is disposed in said housing upper part;
a spindle removably connects said electric drive in a rotationally fixed manner to said turning device through an automatically released connection; and
said connection automatically releases when said housing upper part is one of removed and pivoted from said housing lower part.

13. The egg cooker according to claim 11, wherein:
said electric drive is disposed in said housing upper part;
said turning device has a spindle removably connecting said electric drive to said turning device in a rotationally fixed manner through an automatically released connection; and
said connection automatically releases when said housing upper part is one of removed and pivoted from said housing lower part.

14. An electric egg cooker, comprising:
a housing lower part;
a housing upper part at least one of:
 removably connected to said housing lower part; and
 pivotally connected to said housing lower part;
a removable, dishwasher-safe, egg holder holding eggs in a cooking position, said egg holder disposed in said housing lower part;
a removable, dishwasher-safe, turning device for turning the eggs, said turning device disposed adjacent said cooking position;
electrical components including:
 a heating device; and
 an electric drive disposed above said cooking position and connected to said turning device for turning said turning device; and
all of said electrical components disposed in said housing upper part and above said egg holder at a distance dependent upon said egg holder.

15. The cooker according to claim 14, wherein said turning device is disposed below said cooking position in said housing lower part.

16. The cooker according to claim 14, wherein:
said turning device has a spindle removably connecting said electric drive to said turning device in a rotationally fixed manner through an automatically released connection; and
said connection automatically releases when said housing upper part is one of removed and pivoted from said housing lower part.

* * * * *